Jan. 13, 1970     T. R. MASTERS     3,489,980

RESISTIVE DEVICE

Filed July 14, 1965

INVENTOR.
Thomas R. Masters
BY Jack Larsen
ATTORNEY

United States Patent Office 3,489,980
Patented Jan. 13, 1970

3,489,980
RESISTIVE DEVICE
Thomas R. Masters, Arlington, Mass., assignor to Microtek Electronics, Inc., Cambridge, Mass., a corporation of Massachusetts
Filed July 14, 1965, Ser. No. 471,836
Int. Cl. H01c 7/00, 13/00
U.S. Cl. 338—308                                    10 Claims

ABSTRACT OF THE DISCLOSURE

An arrangement of seven printed resistors in series, jacks at their junctions and miniature patch cords to interconnect selected terminals is shown to provide all of the standard 10% resistance values in a range between a minimum value and a maximum 100 times greater, such as from one ohm to 100 ohms. Using the same resistor pattern and different resistance compositions or film thicknesses, gives a different range, say 10,000 ohms to one megaohm. The embodiment disclosed is small, convenient, and cheap enough to be used in "breadboard" work saving the cost of an extensive inventory of resistors and of the time spent hunting for the right one. The preferred embodiment comprises a thin alumina substrate about one-inch square, eight jacks fastened on solder pads distributed at the edges of the square, metal-bearing film contact strips connected to each jack, and resistance films between the strips in the ratio 32:1:2:4:8:16:32. The whole is encapsulated to resemble a domino in appearance.

---

This invention relates to electrical resistance elements, and more particularly to a novel miniature tapped precision resistor which may be used in breadboard circuitry and modified to assume thousands of different resistance values, each accurately known.

While the design of electronic circuits by mathematical and graphical techniques is both a science and an art, it is often found that a design which is good on paper can be improved by "breadboarding" and adjusting the design variables. It is also desireable to test the performance of circuits over a range of variables to predict changes which may result from changes in parameters with age and with different environmental conditions.

It has been common for engineers to use "pots" (potentiometers) and rheostats to provide adjustable resistance in breadboard circuits. On occasion, a resistance decade box or a calibrated attenuator is used.

These prior-art devices all have several shortcomings which afflict them in various combinations. The first of these is large size. The resistors which are used in production equipment are very small, even in "conventional" circuitry. In contrast, a precision potentiometer or decade box may well be thousands of times larger than the part which is its fixed electrical equivalent. The second problem is cost. Such devices are expensive, typically worth dollars compared to cents for the fixed resistor. Finally, when small adjustable units are used, the value to which it is set cannot be determined with accuracy by inspection. It is sometimes necessary to disconnect the variable resistor to measure it with a bridge.

It is an object of the present invention to provide a precision adjustable resistor which is more nearly comparable in size and cost to conventional fixed resistors, and which can be set to any predetermined standard resistor value without precision instruments or special tools, and for which the resistance value can be determined by inspection.

A feature of this invention by which these objects are achieved is the use of screen-printed hybrid circuitry techniques as described in a booklet entitled "Screen Printed Hybrid Integrated Circuitry," available from E. I. du Pont de Nemours & Company (Inc.) Electrochemicals Department, Wilmington, Delaware.

A further object of this invention is to provide a precision adjustable resistor which is low in cost.

Another feature of the invention is the series-connection of a plurality of resistors having resistances successively increasing in geometric progression. A further feature of the invention is the use of miniature jacks fixed to the hybrid circuit substrate to mate with miniature patch cords.

Other objects and features of the invention will be comprehended from the following specification and annexed drawings of which:

Figure 1:
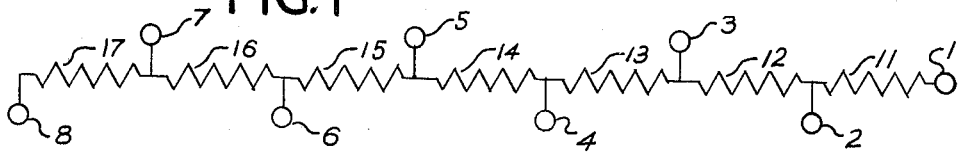
FIG. 1 is an electrical schematic diagram of the preferred embodiment.

FIG. 1 is a schematic diagram of an embodiment of the invention having a nominal total resistance of 9,500 ohms, with which the experimenter can form all of the standard 5% resistor values from 51 ohms to 9,500 ohms. It consists of terminals 1, 2, 3, 4, 5, 6, 7 and 8 at the ends of series connected resistors 11, 12, 13, 14, 15, 16 and 17 of 3200, 100, 200, 400, 800, 1600 and 3200 ohms respectively, within 2% each.

Other values of the device having total resistances of 95 ohms, 950,000 ohms, and $9.5 \times 10^7$ ohms provide coverage of the range of practical resistance values in electronics. In general, it is convenient to make the resistors with total resistance given by the expression $R = 9.5 \times 10^7$ ohms, where N is any integer from one to seven inclusive.

Table I shows the connections of terminals by which the resistor of FIG. 1 may provide the standard values within 5%.

TABLE I.—UNIVERSAL RESISTOR VALUES
(+5= INCREMENTS)

| Ohms: | From | To | Jumper |
|---|---|---|---|
| 51 | 1+3+5+7 | 2+4+6+8 | None. |
| 56 | 3+5 | 2+4 | Do. |
| 62 | 3+6 | 2+4 | Do. |
| 68 | 3 | 2+4 | Do. |
| 75 | 2+5 | 3+4+6 | Do. |
| 82 | 2+5 | 3+4 | Do. |
| 91 | 2+6 | 3+4 | Do. |
| 100 | 2 | 3 | Do. |
| 110 | 4+6 | 3+5+7 | Do. |
| 120 | 4+6 | 3+5 | Do. |
| 130 | 3+5 | 4 | Do. |
| 150 | 1+4+7 | 3+6 | Do. |
| 160 | 1+4 | 3+6 | Do. |
| 180 | 1+4 | 2+3 | Do. |
| 200 | 3 | 4 | Do. |
| 220 | 2+6+8 | 1+5+7 | 3+4. |
| 240 | 1+4+6+ | 2+7 | None. |
| 270 | 5 | 4+6 | Do. |
| 300 | 2 | 4 | Do. |
| 330 | 3+6 | 5 | Do. |
| 360 | 1+5 | 2+4 | Do. |
| 390 | 4 | 5 | Do. |
| 430 | 3+7 | 5+6 | Do. |
| 470 | 3 | 5 | 2+4. |
| 510 | 2 | 5 | 3+4. |
| 560 | 2 | 5 | 6+4. |
| 620 | 3 | 5 | None. |
| 680 | 4+7 | 6 | Do. |
| 750 | 2+7 | 6 | Do. |
| 820 | 5 | 6 | Do. |
| 910 | 2 | 6 | 3+5. |
| 1.0k | 3 | 6 | 4+5. |
| 1.1k | 2 | 6 | 4+5. |
| 1.2k | 4 | 6 | None. |
| 1.3k | 2 | 6 | 3+4. |
| 1.5k | 2 | 6 | None. |
| 1.6k | 6 | 7 | Do. |
| 1.8k | 3 | 7 | 4+6. |
| 2.0k | 4 | 7 | 5+6. |
| 2.2k | 3 | 7 | 5+6. |
| 2.4k | 5 | 7 | None. |
| 2.7k | 2 | 7 | 4+5. |
| 3.0k | 3 | 7 | None. |

TABLE I.—UNIVERSAL RESISTOR VALUES
(1+5= INCREMENTS)—Continued

| Ohms: | From | To | Jumper |
|---|---|---|---|
| 3.3k | 1 | 3 | None. |
| 3.6k | 1 | 5 | 2+4. |
| 3.9k | 1 | 5 | None. |
| 4.3k | 1 | 6 | 4+5. |
| 4.7k | 1 | 6 | None. |
| 5.1k | 2 | 8 | 4+6. |
| 5.6k | 5 | 8 | None. |
| 6.2k | 3 | 8 | Do. |
| 6.8k | 1 | 8 | 4+7. |
| 7.5k | 1 | 8 | 3+4, 6+7. |
| 8.2k | 1 | 8 | 4+6. |
| 9.1k | 1 | 8 | 4+5. |
| 9.5k | 1 | 8 | None. |

Figure 2:
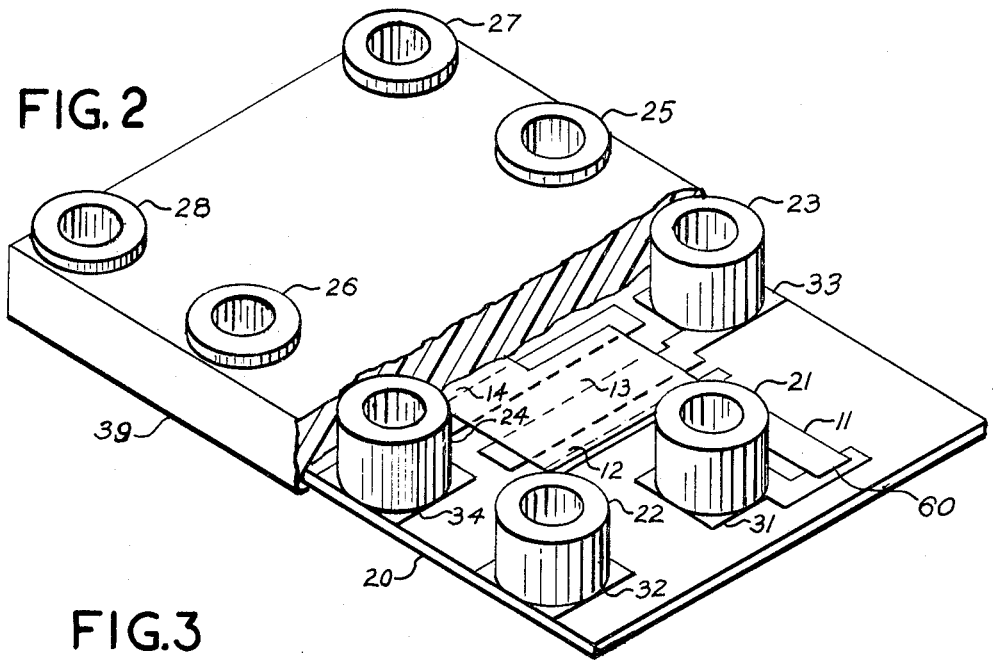
FIG. 2 is a cut-away isometric drawing of the invention.

FIG. 2 is a cut-away view of the device. The resistors 11, 12, 13 and 14 are deposited as a thin film on a ceramic substrate 20. Connections to the terminals 1, 2, 3, 4, 5, 6, 7 and 8 are made through jacks numbered 21, 22, 23, 24, 25, 26, 27 and 28 respectively. These jacks are soldered to spots 31, 32, 33 and 34 which are part of the screened-on noble metal thin film pattern which makes up the remainder of the terminals and which contacts a resistive glaze which forms the resistors 11, 12, 13, and 14. Four of the jacks 22, 24, 26 and 28 for the even-numbered terminals are evenly spaced in line along one edge. The jack 21 for the first terminal is centered on one end and indexes the unit. The remaining three jacks 23, 25 and 27 are spaced apart in a line parallel to the even-numbered jacks; and the row of odd-numbered jacks is separated from the row of even-numbered by twice the separation between sucessive jacks in each row. The whole is enclosed by a protective and insulating plastic encapsulant 39. The terminal arrangement lacks symmetry, so that there is no ambiguity, and at the same time allows the use of jumpers and patch cords in only a few lengths to provide the necessary patching by which resistor values are set.

The jacks 21 through 28 are simple brass parts with spring inserts for reliable electrical contact. A suitable commercially available part is supplied by Cambridge Thermionic Corporation as their part number 3388-1-03. It mates with pin-tipped jumpers which are their part number 3300-1.

The inside diameter of the jack is about 0.04 inch the outside diameter about ⅛ inch and length about ¼ inch. The completed device of FIG. 1 is typically 1″ x 1″ x ⅜″ thick.

An alternative embodiment of the device employs male-type contact posts in place of the female jacks. Soldering of jumpers to these pins is convenient and makes this form preferable in some work.

While adjustable resistors of the kind just described might be made by vapor deposition, sputtering, photochemical or screening processes, I prefer the above-mentioned Du Pont process wherein the fired resistor is a glosy black film containing chain-like aggregates of particles of precious metals such as silver and palladium sintered together in a glassy matrix and tightly bonded to the ceramic substrate. Du Pont offers a 7800-Series and 8000 Series of Resistor Compositions suitable for application by the screen printing process. The patterns are screened through stainless steel screen, in a variation on the silk-screen process, and subsequently fired as a glaze on a ceramic (preferably aluminum oxide) substrate.

Figure 3:
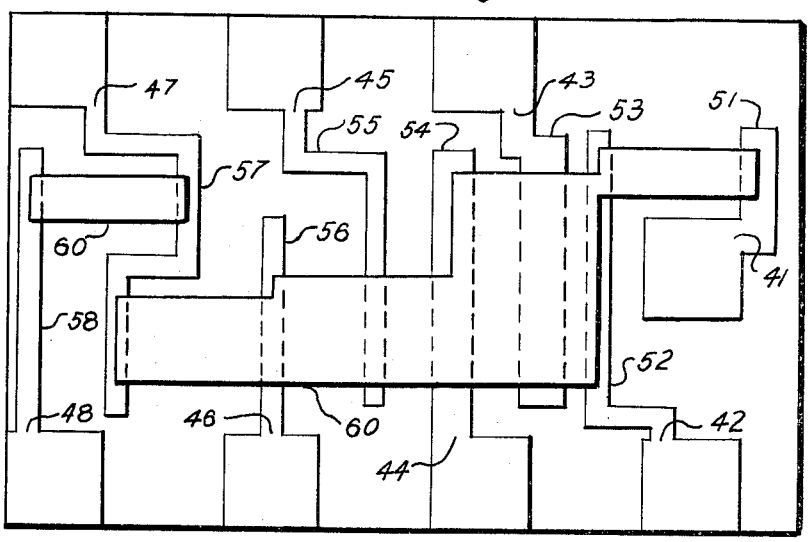
FIG. 3 is a plan of the pattern of resistive and conductive glazes on the microcircuit substrate.

The pattern of conducting and resistive glazes for the article of FIG. 2 is shown in FIG. 3.

The pattern of conductors is printed first and each terminal has a corresponding pattern 41, 42, 43, 44, 45, 46, 47 and 48. Each of these has a solder base and a contact band. The contact bands 51, 52, 53, 54, 55, 56, 57 and 58 are generally parallel and extending vertically as drawn. Over the pattern of conductors, the pattern of resistive glaze is printed and fired, the resistive material 60 connects the conductors to form the circuit of FIG. 1. With care, a high degree of uniformity can be achieved so that the resistance depends primarily upon the geometry; but perfection is not achieved, so the resistors are subsequently adjusted or trimmed to precise values by eroding an edge of the resistive strip with a dental type grit-blasting tool, or a spark-eroding process. Both permit resistance measurements to be made while trimming. The generally parallel arrangement of contact bands facilitates this process and also favors uniform heat dissipation, and simplified design.

The resistance of a rectangle between opposite sides is readily calculated. It is equal to the surface resistivity in ohms per square, multiplied by the length of the current path divided by the width of the current path.

It will be apparent that only one set of patterns is needed for any range of device, only the ohms per square of the resistive glaze is changed to cover a higher or lower range of resistances.

It will be appreciated that the invention as described by reference to the example of a particular preferred embodiment is none-the-less amenable to execution by designers in endless variation without departing from the spirit and scope of the invention as defined by the following claims.

I claim:
1. A device comprising a flat, thin, ceramic, substrate,
   a noble-metal-bearing glaze dpeosited on one side of said substrate in a pattern defining eight conductive contact bands extending in generally parallel relation one to the next,
   seven resistive-film resistors, formed by a second noble metal-bearing glaze deposited in electrical connection over said first glaze, in a pattern defining resistive paths between said bands,
   said paths having resistances related one to the next in the proportions 32:1:2:4:8:16:32, and
   eight upstanding electrical contact jacks fixed one to each of said bands for making temporary electrical connections to each of said bands.

2. A device as defined by claim 1 having a plastic encapsulant enclosing said substrate, glazes, and a part of each of said jacks.

3. An article comprising a ceramic substrate, a noble-metal bearing film deposited on said substrate in a pattern defining eight conductive bands extending generally parallel one to the next and each provided with a solder base, eight upstanding electrical contact jacks fixed one to each said base, a resistive second noble-metal-bearing film depostied in a pattern forming seven resistors each in electrical connection with a different pair of said bands having resistances related one to the next in the proportions 32:1:2:4:8:16:32 in the order of their connection, and a plastic encapsulant enclosing said substrate, films, and a part of each of said jacks.

4. A vitreous substrate, a metal-bearing film deposited on said substrate in a pattern defining eight electrically conductive contact bands each provided with a solder base, eight electrical contact jacks fixed each to a different one of said bases, and a noble metal-bearing film deposited in a pattern in electrical contact with said bands to provide resistances between said bands, said resistances relating one to the next in proportions 32:1:2:4:8:16:32 in the order of their connection.

5. An article comprising a flat, thin, ceramic substrate, a noble-metal bearing glaze deposited on one side of said substrate in a pattern defining eight conductive contact bands extending in generally parallel relation one to the next, and each provided with a solder base, eight upstanding electrical contact jacks fixed each to a different one of said bases, a second noble-metal-bearing glaze deposited in a pattern in electrical contact with said bands to provide resistances between said bands, said resistances related one to the next in the proportions 32:1:2:4:8:16:32, and a plastic encapsulant enclosing said substrate, glazes, and a part of each of said jacks.

6. A device comprising a flat, thin, substrate,
   a metal-bearing conductive film deposited on said substrate in a pattern defining eight conductive contact bands extending in generally parallel relation one to the next,
   seven resistive-film resistors formed by a second film deposited in electrical connection over said first film in a pattern defining resistive paths between said bands,
   said paths having resistances related one to the next in the proportions 32:1:2:4:8:16:32, within two percent, and
   eight electrical contact jacks fixed one to each of said bands for making temporary electrical connections to each of said bands.

7. A device comprising a flat, thin, substrate,
   a metal-bearing conductive-film layer deposited on said substrate in a pattern defining seven conductive bands extending in generally parallel relation one to the next,
   six substantially rectangular film resistors deposited on said substrate interconnecting successive pairs of said bands and having length-of-current-path to width-of-current-path ratios progressing substantially in the proportions 1:2:4:8:16:32,
   seven contact pads, each connected by said film layer to one of said bands,
   seven cylindrical connectors fixed one to each of said pads with axis normal to said substrate, for making temporary electrical connections to each of said bands, and
   a trimming resistor connected in series with said six resistors of value such that standard 5% resistor values may be synthesized with jumpers.

8. A device as defined in claim 7 having a plastic encapsulant enclosing said substrate, layer, resistors, and a part of each of said connectors.

9. A device comprising a flat, thin, substrate,
   a metal-bearing conductive-film layer deposited on said substrate in a pattern defining seven conductive bands extending in generally parallel relation one to the next,
   six substantially rectangular film resistors deposited on said substrate interconnecting successive pairs of said bands and having length-of-current-path to width-of-current-path ratios progressing substantially in the proportions 32:1:2:4:8:16,
   seven contact pads, each connected by said film layer to one of said bands,
   seven cylindrical connectors fixed on to each of said pads with axis normal to said substrate, for making temporary electrical connections to each of said bands, and
   a trimming resistor connected in series with said six resistors of value such that standard 5% resistor values may be synthesized with jumpers.

10. A device as defined by claim 9 having a plastic encapsulant enclosing said substrate, layer, resistors, and a part of each of said connectors.

References Cited

UNITED STATES PATENTS

| | | | |
|---|---|---|---|
| 1,665,499 | 4/1928 | Hoch | 338—77 X |
| 2,507,036 | 5/1950 | McCrumm et al. | 338—254 X |
| 2,632,831 | 3/1953 | Pritikin et al. | 338—140 |
| 2,953,764 | 9/1960 | Tellkamp | 338—309 |
| 3,063,031 | 11/1962 | Edwards et al. | 338—255 X |
| 3,111,639 | 11/1963 | Ploke | 338—140 |
| 3,200,298 | 8/1965 | Garibotti | 317—101 |
| 3,344,387 | 9/1967 | Kinkel et al. | 338—314 |

JOSEPH V. TRUHE, Primary Examiner

J. G. SMITH, Assistant Examiner

U.S. Cl. X.R.

338—77